No. 777,086. PATENTED DEC. 13, 1904.
J. H. EMERY.
BRICK MOLDING MACHINE.
APPLICATION FILED OCT. 20, 1904.
NO MODEL. 3 SHEETS—SHEET 2.

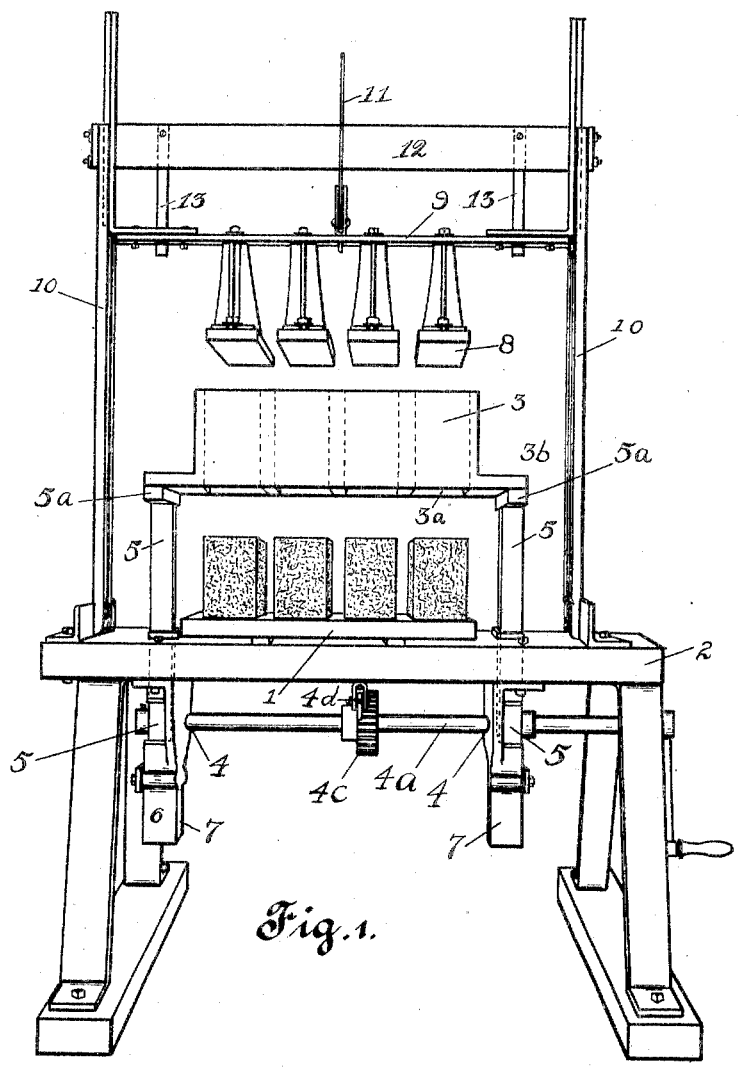

WITNESSES:
W. J. Cathcart.
J. S. See.

John H. Emery. INVENTOR
BY
Geo. B. Willers. ATTORNEY

No. 777,086. PATENTED DEC. 13, 1904.
J. H. EMERY.
BRICK MOLDING MACHINE.
APPLICATION FILED OCT. 20, 1904.
NO MODEL. 3 SHEETS—SHEET 3.

WITNESSES:
W. J. Cathcart.
J. S. See.

John H. Emery, INVENTOR

BY

Geo. B. Willcox, ATTORNEY

No. 777,086.

Patented December 13, 1904.

UNITED STATES PATENT OFFICE.

JOHN H. EMERY, OF WEST BAY CITY, MICHIGAN.

BRICK-MOLDING MACHINE.

SPECIFICATION forming part of Letters Patent No. 777,086, dated December 13, 1904.

Application filed October 20, 1904. Serial No. 229,305. (No model.)

*To all whom it may concern:*

Be it known that I, JOHN H. EMERY, a citizen of the United States, residing at West Bay City, in the county of Bay and State of Michigan, have invented certain new and useful Improvements in Brick-Molding Machines; and I do hereby declare the following to be a full, clear, and exact description of the invention, such as will enable others skilled in the art to which it appertains to make and use the same.

This invention is a machine for molding bricks or blocks of cement or similar material; and the improvements consist in certain constructions and combinations of parts and the equivalents thereof by which I attain the objects of my invention. These objects are to provide means for molding upon a removable tray or other support a plurality of bricks, together with means for removing the bricks from the molds without removing them from the tray, means for preventing breakage of the bricks while being removed from the molds, and means for suspending the brick-forming mechanism of the machine out of the way while the molds are being filled.

With these and certain other objects, which will appear later in this specification, in view, my invention consists in the devices illustrated in the accompanying drawings, in which—

Figure 3:
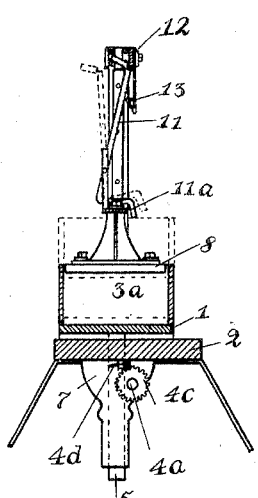
Figure 2:
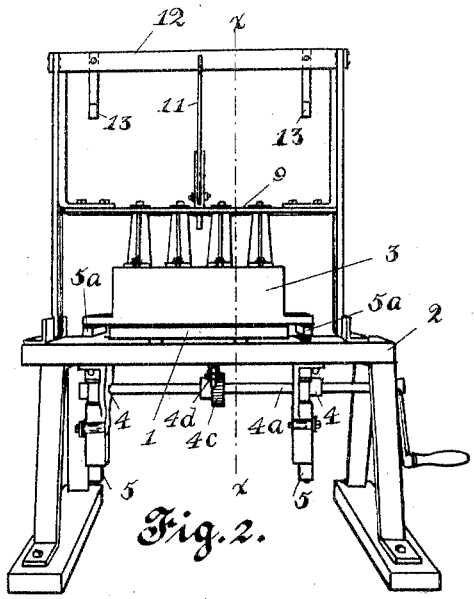
Figure 4:
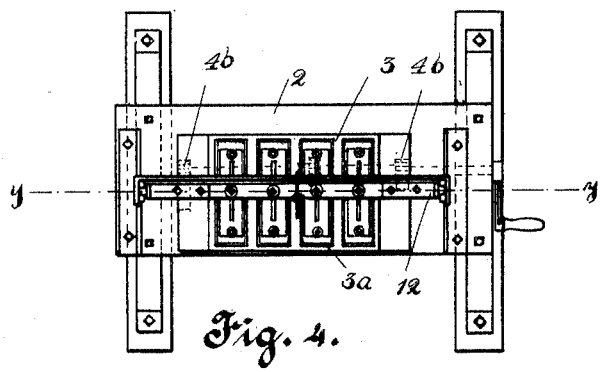
Figure 7:
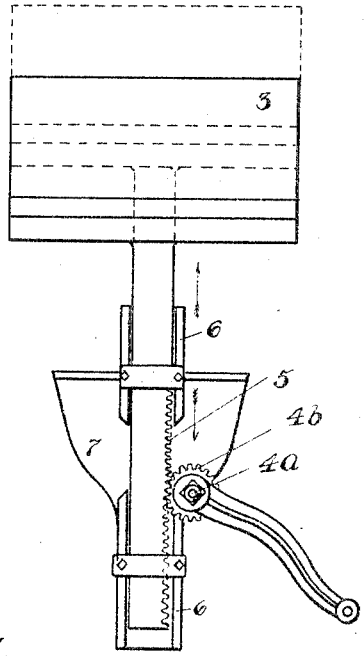
Figure 6:
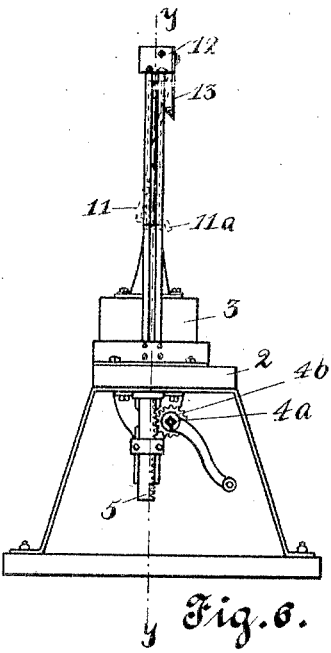
Figure 5:
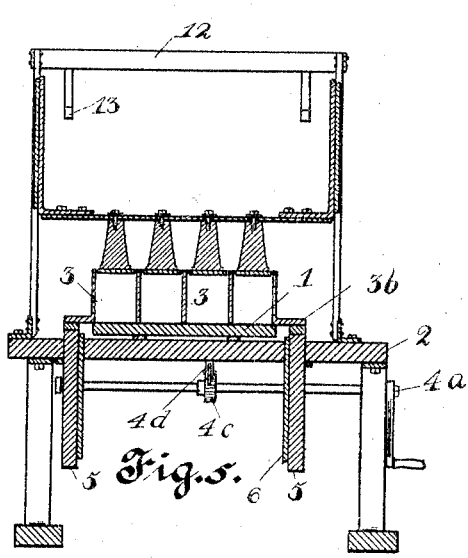
Figure 8:
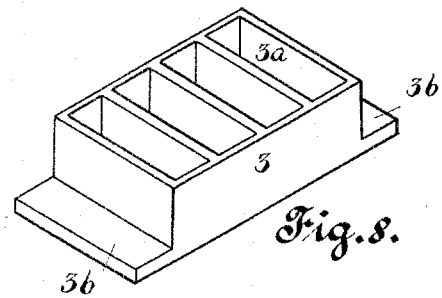
Figure 9:
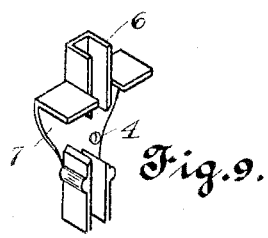

Figure 1 is a front elevation of the machine with the cells or molds and the tamping-plungers raised. Fig. 2 is a similar view showing the same parts lowered. Fig. 3 is a vertical section taken on the line $x\,x$ of Fig. 2. Fig. 4 is a top plan view of the parts shown in Fig. 2. Fig. 5 is a vertical section taken on the line $y\,y$ of Fig. 4. Fig. 6 is a side view of the parts shown in Fig. 2. Fig. 7 is an enlarged detail of the mechanism for raising and lowering the cells. Fig. 8 is a perspective detail of the nest of cells. Fig. 9 is a perspective detail of one of the brackets in which the lifting-bars operate.

A removable tray or board 1 forms the base on which the bricks are molded and upon which the bricks after they are formed are carried to storage, where they season until thoroughly hard. The tray 1 rests upon a suitable supporting-table 2, which forms the base of the machine.

A mold or nest of cells 3 rests upon the tray 1 while the bricks are being formed. This mold 3 is preferably a casing formed with a number of vertical cells $3^a$, each cell being of the size and form of the completed brick. The cells are open top and bottom, and the lower edge of the mold 3 is provided with laterally-extending flanges $3^b$, by which the mold is raised and lowered. Beneath the table 2 is mounted, by means of suitable bearings 4, a shaft $4^a$, carrying a pair of pinions $4^b$. These pinions engage a pair of racks 5, that are moved up and down simultaneously by the pinions. The racks are alined by vertical guides 6, carried by the bracket 7, which also carries the bearings 4. Cross-bars $5^a$ are secured to the upper ends of the racks 5, and upon these cross-bars the molds 3 are lifted.

A mold having been set on the tray 1 and the cells $3^a$ having been filled with cement or other brick material, the cement is tamped by means of plungers 8, carried by the cross-bars 9, the ends of which are vertically slidable in guides 10, rigidly fixed to the table 2. The tamping-plungers may be moved up and down by any suitable means. When the material is sufficiently tamped, the tamping-plungers are locked in place on the tops of the bricks by means of a latch 11. (Shown in Figs. 2 and 3.) This latch is pivoted to the cross-bar 9 and is in the form of an L-shaped bar the upper end of which rests against the upper cross-bar 12 of the frame, and the lower end, which is provided with a downward projection $11^a$, is practically over the mold 3. When the tamping-plungers have tamped the material sufficiently, the upper end of the bar 11 engages under the stationary bar 12 and locks the plungers 8 down upon the bricks. The shaft $4^a$ is then revolved, raising the racks 5 simultaneously and lifting the mold 3 clear of the table and of the bricks upon it. The plungers meanwhile remain on the tops of the bricks and act as stripping-plates to prevent injuring of the upper edges of the bricks. When the mold 3 is raised clear of the bricks and plunger-feet, the top edge of the mold comes in contact with the lower end 11ª of the latch-bar 11, and thereby tilts back the upper end of the bar, releasing it from engagement with the bar 12 and allowing the mold 3 to lift the plungers and the bar 9 as it moves up. Near the top of its travel bar 9 is engaged by a pair of spring-catches 13, which hold it suspended above the tray 1, as shown in Fig. 1.

Reverse movement of the shaft is prevented by means of a ratchet-wheel 4ᶜ, carried by the shart 4ª, and a stationary pawl 4ᵈ, engaging the wheel. When the pawl 4ᵈ is released, it permits the mold 3 to be moved up and down at will.

When the mold and tamping-plungers are lifted, as above described, the tray 1 may be removed, together with the bricks on it, into storage for seasoning. A new tray 1 is then put in place on top of the table 2, the mold 3 is let down upon it, the cells 3ª are filled with fresh material, and the process is repeated as before.

By the means above described I am enabled to produce perfectly-formed cement bricks very rapidly and economically, since the bricks remain undisturbed on trays until perfectly hardened, and the amount of breakage is very small.

What I claim as my invention, and desire to secure by Letters Patent, is as follows:

1. In combination with the stationary table and a removable tray resting thereon; of a mold above said tray, comprising a plurality of open cells and having laterally-extending flanges; a pair of brackets secured beneath said table; vertical guides on said brackets; a rack vertically movable in said guides and passing through the table; the upper ends of said racks engaging the flanges of the mold to lift it; a horizontal shaft revolubly mounted in said brackets; a pair of pinions on said shaft meshing respectively with said racks; a ratchet-wheel on said shaft; a pawl carried by the table and engaging said wheel; vertically-movable tamping-feet; registering respectively with said cells, and catches to suspend the tamping-feet above said mold, substantially as described.

2. The combination with the stationary table and a removable tray resting on said table; of a mold vertically movable above said tray and comprising a plurality of cells each open both top and bottom; vertically-movable tamping-feet registering respectively with said cells; a vertically-movable cross-bar supporting said tamping-feet; vertical guide-bars on said stationary table; a horizontal bar mounted on top of said guide-bars; an L-shaped latch pivotally mounted on said cross-bar; the lower end of said latch being directly above the upper edge of said mold; said latch being adapted, by engagement of its upper end with said bar, to lock the tamping-feet in position when resting on the tamped bricks and to unlock said tamping-feet by engagement with said mold, substantially as described.

In testimony whereof I affix my signature in presence of two witnesses.

JOHN H. EMERY.

Witnesses:
  W. I. CATHCART,
  W. E. SCHUESSLER.